H. GROVER, Jr.
LUNCH HOLDER.
APPLICATION FILED NOV. 13, 1911.
1,049,706.
Patented Jan. 7, 1913.
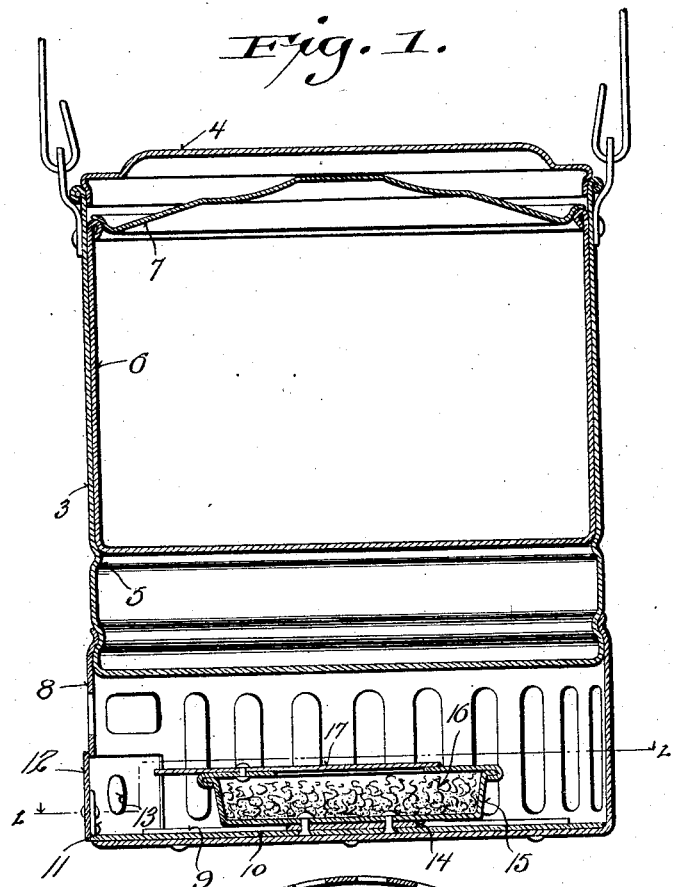
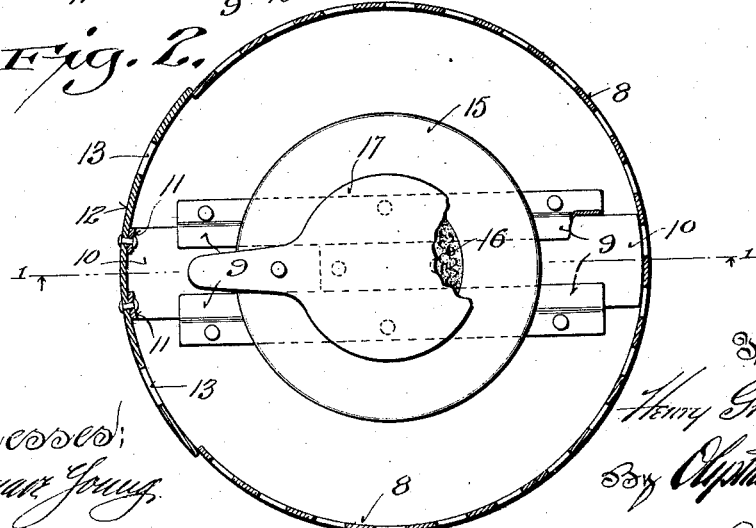

UNITED STATES PATENT OFFICE.

HENRY GROVER, JR., OF TWO RIVERS, WISCONSIN, ASSIGNOR TO ALUMINUM GOODS MFG. COMPANY, OF MANITOWOC, WISCONSIN, A CORPORATION OF NEW JERSEY.

LUNCH-HOLDER.

1,049,706.    Specification of Letters Patent.    Patented Jan. 7, 1913.

Application filed November 13, 1911. Serial No. 660,041.

*To all whom it may concern:*

Be it known that I, HENRY GROVER, Jr., a citizen of the United States, and resident of Two Rivers, in the county of Manitowoc and State of Wisconsin, have invented certain new and useful Improvements in Lunch-Holders; and I do hereby declare that the following is a full, clear, and exact description thereof.

My invention consists in what is herein particularly set forth with reference to the accompanying drawings and pointed out in the claim of this specification, its object being to provide lunch holders each having a simple economical and efficient heater attachment.

Figure 1 of the drawings represents a vertical section view of a lunch holder provided with a heater attachment in accordance with my invention, the section being indicated by line 1—1 in Fig. 2, and said Fig. 2, represents a horizontal section of the heater cage of said receptacle on line 2—2 in Fig. 1.

Referring by numerals to the drawings, 3 indicates a pail provided with a cover 4, and fitting the pail against an inner bead 5 of the same is a removable receptacle 6 for solid food the same being provided with a cover 7. The depth of the receptacle 6 is such as to provide for space for liquid food between its bottom and that of the pail.

Crimped or otherwise suitably secured to the pail to depend therefrom is a cage 8 in which to employ a heating appliance under the bottom of said pail. The cage is herein shown as having a solid bottom. Riveted or otherwise secured on the bottom of the cage are guides 9 for a slide 10 and outer end ears 11 of the slides are similarly fastened to a grip-plate 12 that conforms to the contour of said cage and closes an opening provided in the wall of the same. The plate 12 is shown provided with thumb and finger openings 13.

Riveted to the slide 10, upon a spacer-plate 14 thereon, is the bottom of a shell 15 packed with asbestos or other suitable non-combustible absorbent material 16 designed to be saturated with alcohol, and a fire-extinguisher plate 17 is pivotally connected to the shell-top to move horizontally thereon and serve as a closure for an opening therein. The spacer-plate 14 is necessary to elevate the shell 15 above the guides 9 for the slide 10.

In practice the slide 10 is pulled out far enough to permit manipulation of the plate 17 to uncover the material 16 in the shell 15. This material being saturated as aforesaid the inflammable substance is ignited and said slide returned to normal position so that the contents of the pail or its equivalent may be heated, it being obvious that any other form of vessel may be substituted for said pail, in which case the receptacle 6 and the cage 8 will be made to conform. Air for the support of combustion is admitted to the cage through the apertures thereof, and with a comparatively small amount of alcohol, the liquid contents of the pail may be quickly heated.

The material of the pail or its equivalent and parts therewith, as above specified, is preferably aluminum.

I claim:

The combination of a pail provided with a depending cage, guides on the cage-bottom, a slide engaging the guides and having a grip-plate therewith constituting a closure for an opening of the cage, a spacer on the slide, and a fuel holding shell fastened in connection with said slide upon the spacer therewith to thereby clear said guides.

In testimony that I claim the foregoing I have hereunto set my hand at Two Rivers in the county of Manitowoc and State of Wisconsin in the presence of two witnesses.

HENRY GROVER, Jr.

Witnesses:
Jos. KOENIG,
AUGUST H. GLOE, Jr.